July 19, 1955
B. G. BLACKMAN
2,713,639
SHOCK-EXCITED OSCILLATORY CIRCUIT
Filed Feb. 21, 1950
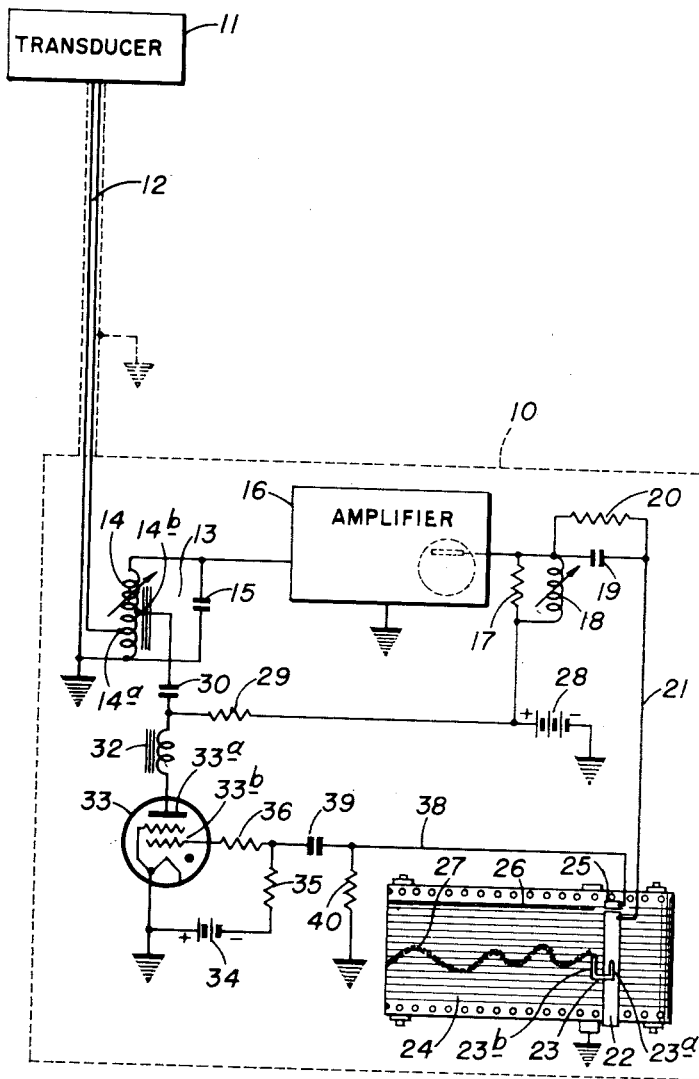
INVENTOR
BIRT G. BLACKMAN
BY *Woodbury*
ATTORNEY

# United States Patent Office 2,713,639
Patented July 19, 1955

2,713,639

SHOCK-EXCITED OSCILLATORY CIRCUIT

Birt G. Blackman, Los Angeles, Calif., assignor to Bendix Aviation Corporation, South Bend, Ind., a corporation of Delaware Application February 21, 1950, Serial No. 145,329

4 Claims. (Cl. 250—36)

This invention relates to electrical systems in which damped oscillations are generated by the application of a unidirectional transient potential to a resonant circuit, and is particularly useful in systems in which an electrical discharge tube is used as a switch or relay to apply the transient potential.

Circuits of this type have been used in echo depth sounding as the source of electrical oscillations to energize a transducer for transmitting short pulses of sonic or supersonic waves. The transient potential is usually produced by suddenly discharging a storage condenser into the resonant circuit, and it is common to employ, as the switching device for completing the discharge path; a grid-controlled space discharge tube such as a thyratron. Such tubes are capable of passing relatively large momentary currents, but wear out rapidly if large currents are discharged therethrough at too frequent intervals.

An object of the present invention is to increase the efficiency of shock-excited oscillatory circuits and at the same time increase the life of the switching device used to apply the transient shocking potential to the oscillation circuit.

This object is achieved by inserting an inductance in series with the switching device in the discharge circuit of the storage condenser. The inductance reduces the peak current through the switching device and thereby prolongs its life. Although it might seem that a reduction in peak intensity of the shocking wave applied to the oscillatory circuit would reduce the amplitude of the oscillations incited therein, it has been found by test that the transfer of energy from the storage condenser to the oscillatory circuit is actually improved if the inductance is not so large as to lengthen the duration of the shock wave more than one-half cycle of the oscillations generated. The optimum delay is obtained by so choosing the value of the inductance element that it resonates with the storage condenser at the oscillation frequency.

When the switching device is a thyratron, I find that further improvement may be effected by inserting a resistor in series with the grid of the thyratron.

A full understanding of the invention may be had from the following description which refers to the drawing.

The single figure of the drawing is a schematic circuit diagram of an echo depth recording system incorporating the invention.

The depth sounder disclosed in the drawing comprises an electrical unit 10 and a transducer 11 which are interconnected by a transmission line 12. In operation, a pulse or train of electrical waves of sonic or supersonic frequency is applied from the unit 10 to the transducer 11, energizing the latter to transmit a pressure wave of corresponding frequency through the water to the bottom, where it is reflected back to the transducer. In response to receipt of the reflected pressure wave, the transducer develops an electrical wave of corresponding frequency which is transmitted to the unit 10 and there caused to produce an indication indicative of the time elapsing between the transmission of the pressure wave from the transducer 11 and return of the corresponding echo.

Various types of circuits have been employed for producing the electrical oscillations used to energize the transducer in depth sounding systems, but since the waves are transmitted in the form of short pulses or trains, it is often convenient to form them by shock-exciting an oscillatory circuit. In the drawing, such an oscillatory circuit is shown at 13 and consists of a variable inductance element 14 and a condenser 15. The lower end of the oscillatory circuit is connected to ground and to one conductor of the transmission line 12 leading to the transducer. The other conductor of the transmission line is connected to a tap 14a on the inductance 14. The upper end of the resonant circuit 13 is connected to the input of an amplifier 16, the output of which is connected through a suitable network consisting of a resistor 17, an inductance 18, a condenser 19, and a resistor 20 to a conductor 21 leading to a contact bar 22 of a recorder. A traveling brush element 23 has one leg 23a which sweeps along the bar 22, and a leg 23b which sweeps across a record element 24. The brush leg 23a also functions to momentarily connect the bar 22 to a short segment 25 positioned closely adjacent to the upper end thereof, to initiate the transmission of a pulse in a manner to be more fully explained later. The transmitted pulse also excites the amplifier 16 and is applied through the bar 22 and the brush legs 23a and 23b to the paper 24 to record a baseline 26 thereon. The echo returning at a later time is amplified and applied through the bar 22 and brush element 23 to produce a second line 27, the distance of which from line 26 is a measure of the depth.

The detailed operation of the circuit and the functions of the various elements therein will now be described.

A source of electrical power, shown as a battery 28, has its negative terminal grounded and has its positive terminal connected through a resistor 29 to one terminal of a storage condenser 30, the other terminal of which is connected to a tap 14b on the inductance element 14. The one terminal of the condenser 30 is also connected through an inductance element 32 with the anode 33a of a thyratron tube 33. Normally the control grid 33b of the thyratron 33 is maintained at a negative potential sufficient to block current flow through the tube, by a biasing battery 34 which is connected to the grid through resistors 35 and 36. Therefore, the condenser 30 and the anode 33a become charged to the full potential of the battery 28.

The positive terminal of the battery 28 is also connected through the inductance element 18 and shunt resistor 17, and through the resistor 20, to the conductor 21, so that the bar 22 is at the full potential of the battery 28. However, as the brush 23a passes from the segment 25 onto the bar 22 (once in each cycle of its operation) the full battery potential is applied from the bar 22 through the segment 25, a conductor 38, a condenser 39 and the resistor 36 to the grid 33b, driving the latter sufficiently positive to cause the thyratron to fire and become conductive. The resistor 20 in shunt to the condenser 19 is of very high value so that no appreciable steady state current can flow from the battery 28 to the conductor 21. However, during intervals between successive contacts between the segment 25 and the bar 22 by the brush element 23a, the right plate of condenser 19 becomes charged through the resistor 20 and at the time of discharge supplies sufficient current to insure firing of the thyratron 33. Following each application of the potential on the condenser 19 to the condenser 39, the latter is restored to ground potential by a leak resistor 40. Likewise, the charge applied to the grid 33b is dissipated within the tube and battery 34 restores the normal negative potential on the grid, permitting the thyratron to extinguish after a single surge of current therethrough.

This single surge of current is supplied by the storage condenser 30, which discharges through the inductance element 32, the anode and cathode of the tube 33, to ground, and thence through the lower portion of the inductance 14 to the tap 14b and back to the other side of condenser 30. This surge of current through the lower portion of the inductance 14 sets up a damped train of oscillations in the oscillatory circuit 13 of frequency corresponding to the resonant frequency of the circuit. This train of oscillations is applied to the amplifier 16 and caused to record an increment in the baseline 26 on the record element 24, as previously mentioned. It is also applied from the tap 14a and the lower end of the inductance element through the transmission line 12 to the transducer 11 to initiate a pressure wave pulse of corresponding frequency. It may be noted that the transmission line 12 may be of considerable length, and for efficient operation it is of relatively low characteristic impedance, and for that reason is tapped into only a portion of the inductance element 14. The transducer 11 may be of any well-known type, usually of the piezo crystal or a magnetostriction type. In either case its reactance is preferably balanced for a reactance of opposite sign so that its characteristic impedance is resistive and matched to the impedance of the line 12.

The present invention resides primarily in the addition to the condenser 30 and tube 33 for shock-exciting the oscillatory circuit 13, of the inductance element 32. Heretofore it has been the practice to connect the storage condenser 30 directly between the oscillatory circuit 13 and the anode 33a of the tube 33. With such a circuit, the only inductance in the discharge circuit was that of the inductance element 14 included between the tap 14b and the lower end thereof, which was relatively small and did not materially impede the discharge of the condenser. 30 The result was that immediately following the transition of the tube 33 from non-conductive to conductive state (by application of positive potential to the grid 33, as previously described) the condenser 30 discharged therethrough with great rapidity, releasing its entire charge in such a short period of time as to produce an extremely high current peak through the tube 33. Thyratron tubes of this type have been found capable of handling such rapid discharges and have a reasonably long life if the impulses are not repeated at too frequent intervals. However, in some depth sounding systems it is desirable to operate the brush mechanism 23 at relatively high speeds to produce successive recordings at very short intervals, and it has been found that, at speeds it is sometimes desired to employ, the tube 33 has a relatively short life.

The short life is due primarily to the peak intensity of the current through the tube, rather than to the total power transmitted through the tube over a long interval of time. It has long been recognized that the rate of discharge of a condenser can be decreased by the inclusion of resistance or inductance in the circuit, but it has been generally considered that to resort to such expedients in a circuit of this kind would greatly reduce the power of the oscillations induced in the resonant circuit 13. In short, it was generally considered that the average amplitude of oscillations generated in a shock-excited circuit was due in a large measure to the suddenness with which shocking current was applied to the circuit. I have discovered, however, that provided the shocking pulse applied to the circuit 13 does not persist for more than onehalf cycle of the waves to be generated, the pulse can be rounded off and its maximum intensity reduced without reducing the power of the waves generated in the circuit 13. The inductance element 32 appears to be of optimum size when it is so chosen as to resonate with the storage condenser 30 at the resonant frequency of the circuit 13. With these proportions, the power developed in the oscillatory circuit 13 and applied to the transducer 11 is actually increased and at the same time the life of the tube 33 is materially increased.

In a system for transmitting waves at 50,000 cycles, the storage condenser 30 may have a capacity of 0.25 mfd. and the inductance element 32 may have a maximum value of 40 microhenries. Comparative tests show that the addition of the inductance element 32 and the grid resistor 36 increases the potential of the oscillations generated in the resonant circuit 13 about 30 percent and increases the life of the tube 33 about five times as compared to the same circuit without the choke 32.

The use of the series grid resistor 36 is also conducive to smooth operation and long life of the tube 33. The resistor 36 may have a value of 10,000 ohms.

Although for the purpose of explaining the invention, a particular embodiment thereof has been shown and described, obvious modifications will occur to a person skilled in the art, and I do not desire to be limited to the exact details shown and described.

I claim:

1. In combination: a single closed parallel resonant circuit to be shock-excited by application of a single potential pulse thereto, and pulse producing means comprising: a storage condenser and means for charging it; a switch element; an inductance; and a discharging circuit for said condenser comprising a closed series circuit containing exclusively a portion at least of said single resonant circuit, said condenser, said inductance, and said switch element; said inductance element being of such size relative to said storage condenser as to resonate therewith at a frequency approximately the same as and at least as high as the natural frequency of said resonant circuit.

2. Apparatus according to claim 8 in which said switch element comprises an electronic valve having an electron-emitting cathode and an anode connected in said closed series circuit, and having a control grid; means normally biasing said grid to cut off; a resistor; and means for impressing a positive pulse on said grid through said resistor to render said valve conductive.

3. An oscillation generator comprising: a closed parallel resonant circuit including a first inductance element and a first capacity element connected in shunt thereto and of a size to resonate therewith at a predetermined frequency; a direct current circuit including in closed series connection a source of direct current, a current-limiting impedance element, a second inductance element, and a current interrupting device; a storage condenser, and a closed series circuit containing exclusively, said storage condenser, said second inductance element, said current interrupting device, and a portion at least of said closed parallel resonant circuit; said second inductance element being of such size relative to said storage condenser as to resonate therewith at a frequency approximately the same as and at least as high as said predetermined frequency.

4. Apparatus according to claim 3 in which: one terminal of said interrupting device is directly connected to one point in said resonant circuit and to one terminal of said direct current source, the other terminal of said device is connected directly to one terminal of said second inductance, one terminal of said current limiting impedance element is connected directly to the other terminal of said direct current source, the other terminals of said second inductance element and said current limiting impedance are connected directly together and to one terminal of said storage condenser, and the other terminal of said storage condenser is connected to another point in said resonant circuit.

References Cited in the file of this patent

UNITED STATES PATENTS

| | | |
|---|---|---|
| 1,543,475 | Lemmon | June 23, 1925 |
| 2,063,025 | Blumlein | Dec. 8, 1936 |
| 2,153,202 | Nicholas | Apr. 4, 1939 |
| 2,244,003 | Eaglesfield et al. | June 3, 1941 |
| 2,390,659 | Morrison | Dec. 11, 1945 |
| 2,495,704 | Rosa | Jan. 31, 1950 |
| 2,579,525 | Varela | Dec. 25, 1951 |